United States Patent
He et al.

(10) Patent No.: US 10,713,683 B2
(45) Date of Patent: Jul. 14, 2020

(54) OUTLIER DATA DETECTION

(71) Applicant: Oath Inc., New York, NY (US)

(72) Inventors: Yan He, Santa Clara, CA (US); Miao Chen, Suunyvale, CA (US); Maria Stone, Pacifica, CA (US)

(73) Assignee: Oath Inc., New York, NY (US)

( * ) Notice: Subject to any disclaimer, the term of this patent is extended or adjusted under 35 U.S.C. 154(b) by 855 days.

(21) Appl. No.: 14/734,515

(22) Filed: Jun. 9, 2015

(65) Prior Publication Data
US 2016/0364745 A1    Dec. 15, 2016

(51) Int. Cl.
*G06Q 30/02* (2012.01)
*G06Q 10/04* (2012.01)

(52) U.S. Cl.
CPC ......... *G06Q 30/0243* (2013.01); *G06Q 10/04* (2013.01); *G06Q 30/0277* (2013.01)

(58) Field of Classification Search
CPC .............................. G06Q 10/00; G06Q 30/02
USPC ................................................ 705/7.11–7.42
See application file for complete search history.

(56) References Cited

U.S. PATENT DOCUMENTS

| | | | | |
|---|---|---|---|---|
| 8,166,155 B1* | 4/2012 | Rachmeler | .......... | G06F 11/3438 709/224 |
| 8,880,996 B1* | 11/2014 | Deshpande | ........ | G06Q 30/0255 715/234 |
| 9,185,095 B1* | 11/2015 | Moritz | .................. | H04L 63/102 |
| 9,378,361 B1* | 6/2016 | Yen | ......................... | G06F 21/55 |
| 2005/0137958 A1* | 6/2005 | Huber | .................... | G06Q 30/02 705/37 |
| 2007/0055477 A1* | 3/2007 | Chickering | ........ | G06K 9/00503 702/182 |
| 2009/0281989 A1* | 11/2009 | Shukla | ................... | G06F 16/972 |
| 2011/0137753 A1* | 6/2011 | Moehrle | ................ | G06Q 30/02 705/27.1 |
| 2012/0303466 A1* | 11/2012 | Boskovich | ......... | G06Q 30/0241 705/14.72 |
| 2014/0019194 A1* | 1/2014 | Anne | ............... | G06Q 10/06393 705/7.28 |
| 2014/0244572 A1* | 8/2014 | Hill | ...................... | G06F 17/3089 707/603 |
| 2016/0117389 A1* | 4/2016 | Saini | ................. | G06F 17/30864 707/722 |
| 2016/0321689 A1* | 11/2016 | Turgeman | ............. | G06F 21/552 |

OTHER PUBLICATIONS

Deng et al., Building a Big Data Analytics Service Framework for Mobile ADvertising and Marketing, Mar. 2015, 2015 IEEE First International Conference on Big Data COmputing Service and Applications.*

* cited by examiner

*Primary Examiner* — Robert D Rines
(74) *Attorney, Agent, or Firm* — Cooper Legal Group, LLC

(57) ABSTRACT

Online experimentation has been widely used to evaluate an effect of a new feature of an online product on user engagement. One challenge is that an existence of outliers can often complicate the analysis of such experimental results. Thus, a procedure is provided herein to detect and remove outliers from experimental results. The procedure can use statistical tests based on parametric distributions of sample maximum or minimum. These tests can be performed using an inward testing procedure to identify multiple outliers. Finally, these filtered test results can be used to control delivery of a new feature of an online product.

20 Claims, 6 Drawing Sheets

OUTLIER DATA DETECTION

BACKGROUND

This application relates to outlier detection for A/B testing on online products.

Online controlled experimentation, such as A/B testing for online products, can include two variants that are the control and test conditions. Online controlled experimentation has become common to estimate impact of product change on user engagement and revenue. It has been widely used to guide product development and support decision making for companies providing online products and content. Many decisions regarding features of online products can rely on the results of these experiments.

One of many issues in outlier detection is being able to detect and differentiate outlier values from extreme yet valid observations. In using parametric distribution models there can be issues, considering online experiment data does not usually fit well into a normal distribution. Therefore, described herein are several solutions for these aforementioned technical problems in detection and removal of outlier values from online experiment data.

BRIEF DESCRIPTION OF THE DRAWINGS

The systems and methods may be better understood with reference to the following drawings and description. Non-limiting and non-exhaustive examples are described with reference to the following drawings. The components in the drawings are not necessarily to scale; emphasis instead is being placed upon illustrating the principles of the system. In the drawings, like referenced numerals designate corresponding parts throughout the different views.

FIG. 1 illustrates page views per user in a week for an online product. FIG. 2 illustrates article clicks per visit of an online product in an online experiment sample.

DETAILED DESCRIPTION

Subject matter will now be described more fully hereinafter with reference to the accompanying drawings, which form a part hereof, and which show, by way of illustration, specific examples. Subject matter may be embodied in a variety of different forms and, therefore, covered or claimed subject matter is intended to be construed as not being limited to examples set forth herein; examples are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Described herein are examples of systems and operations for outlier detection in online experiment data. For example, to evaluate the effect of new product features, the system and operations described herein can compare metrics from controlled tests. Also, for example, data sets can include or be derived from metrics collected from test and control buckets of an A/B test. The data sets can be impacted or even invalidated by outliers generated by robots, fraud, and instrumentation errors, for example. This is one of the many reasons for the systems and operations described herein.

In an example, an outlier can be an observation that deviates so much from other observations as to arouse suspicion that it was generated by a different mechanism than those mechanisms that are under observation. An outlier value can indicate statistically that more likely than not the value is invalid. Online, an outlier value can indicate statistically that more likely than not the outlier value is due to user engagement with the online product by an Internet bot or another type of artificial mechanism. Also, an outlier value can indicate statistically that more likely than not the outlier value is due to fraudulent user engagement with the online product.

The outlier detection method can include parametric and non-parametric methods. Parametric methods assume a known underlying distribution of the observations, and outlier values include those observations that deviate from model assumptions. Non-parametric methods are free of model assumptions. An example of a non-parametric method includes cluster analysis.

Figure 1:
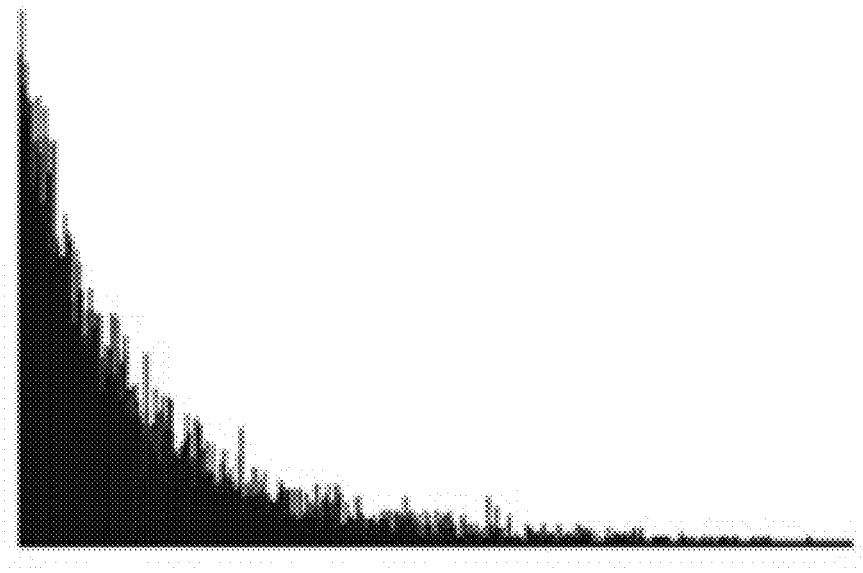
FIGS. 1 and 2 illustrate bar diagrams of online user engagement data.

The bar graph in FIG. 1 illustrates an example data set from an online experiment, such as an A/B test. In FIG. 1, the bar graph illustrates a sample distribution of page views per user in a week, for an online product. There are outlier values within the illustrated data set, which may have been generated by robotic and/or fraudulent activities. These outlier values are not clearly clustered and separated from normal users, and in particular, heavy users that deviate from the norm. FIG. 1 also illustrates that the counts drop smoothly with page view values increasing, and there is no clear boundary to separate outliers from the data set. Therefore, one of many ways to resolve the problem with unclear boundaries between outliers and the remainder of the data set is to use a parametric outlier detection method.

In a parametric outlier detection method, it can be assumed that a small number of observations from a large sample will follow a normal distribution, such as $N(\mu, \sigma^2)$. Outlier identification can include identifying observations that lie in an outlier region. For any confidence coefficient, such as $\alpha$, $0<\alpha<1$, the outlier region of a normal distribution can be out$(\alpha, \mu, \sigma^2)=\{x: |x-\mu|>z_{1-\alpha/2}\sigma\}$, where $z_{1-\alpha/2}$ $1-\alpha/2$ quantile of the normal distribution. A number x can be a $\alpha$-outlier with respect to a target distribution F, if $x \in $ out$(\alpha, \mu, \sigma^2)$. Also, the with the distribution $P(x \notin $ out$(\alpha, \mu, \sigma^2))=1-\alpha$, a sample size n, and out$(\alpha, \mu, \sigma^2)=\{x: |x-\mu|>z_{1-\alpha/2}\sigma\}$, the outlier region can be out $$(\alpha_n, \hat{\mu}, \hat{\sigma}^2) = \left\{x:|x-\hat{\mu}| > z_{1-\frac{\alpha_n}{2}}\hat{\sigma}\right\}.$$

In such an example, $\alpha_n = 1-(1-\alpha)^{1/n}$. Also, given a sample $X_N = \{x_1, \ldots, x_n\}$, without outliers, the following probability can be expected: $P(x_1, \ldots, x_n \notin \text{out}(\alpha_n, \hat{\mu}, \hat{\tau}^2)) = 1-\alpha$.

Figure 2:

There may be issues with these assumptions, especially in the case of online experiment data. For example, there can be a blur between the boundary of outliers and valid values, as illustrated by FIGS. 1 and 2. Also, outcomes of controlled testing for online products can have skewed results. For example, FIGS. 1 and 2 illustrate how a data set associated with product features clicked per visit can be highly skewed to the right, for example. In other words, distributions illustrated in FIGS. 1 and 2 would not fit a normal distribution. With an incorrect normal assumption, regular data points may be erroneously reported as outliers and outliers could go undiscovered. Therefore, F as non-normal target distribution may be more useful to detect outliers for online experiment data.

Another issue that may occur is the occurrence of multiple outliers in online experiment data. In such examples, masking and swamping effects can occur. A masking effect can include when a first outlier masks a second outlier, wherein the second outlier could be considered as an outlier independent of the first outlier. Often the second outlier is unidentifiable until the first outlier is removed from the data set. A swamping effect can include a first outlier swamping a second observation, where the second observation is considered a second outlier due to the first outlier. Masking can occur when multiple outliers skew the mean and variance estimates in the direction of the outliers, and the resulting distance of the outliers from the mean is relatively small. Masking is common in online experiment data, since large outlying values do exist and can skew the mean and variance to the right. In such cases, some outliers might be masked by more extreme values and therefore would not be identified.

To resolve the aforementioned effects of masking and swamping, inward testing and/or forward selection methods could be introduced to remove masking and swamping effects in the detection of outlier values. These procedures can detect outliers in multiple steps, and in the steps of such procedures, a system can test whether the most extreme value (e.g., the maximum value or the minimum value) is an outlier. Wherein a procedure identifies an outlier, the outlier is eliminated and the procedure repeats the outlier detection with the reduced sample of the data set. If no outlier is detected, the procedure ends and the data set can be used (such as for guiding the delivery of a feature of an online product).

In an example, the method can derive a parametric distribution model for online experiment data with a Box-Cox transformation and a hurdle model. Such a technique can accommodate continuous distributions such as data on dwell time. The technique can also accommodate discrete distributions, such as those associated with page views and clicks on features. Both types of distributions can be highly skewed could be misinterpreted using procedures using a normality assumption.

Additionally, multiple outliers can exist in the data sets, which are subject to masking and swamping effects. The method can universally apply to any non-negative data whether or not the normal assumption holds true. The method can also solve masking and swamping issues with a sequential testing procedure.

The method can begin with fitting a parametric distribution model for user-level web analytics data. The method can apply a Box-Cox transformation method to transform web analytics data in order to fit a parametric model with normal distribution. The method can also apply a hurdle model to fit a parametric model using a negative binomial distribution, such as a zero-truncated negative binomial distribution. Subsequently, the procedure can derive a distribution of sample maximum and/or sample minimum based on the parametric distribution obtained by the Box-Cox transformation method and/or the hurdle model. Also, these steps can be repeated through an inward testing procedure to detect multiple outliers sequentially. At a step of the inward testing, the most extreme observation of the sample, which can be derived from the sample maximum or minimum value, is tested for being an outlier or not. Specifically, probability of sample maximum or minimum being as extreme as the observed value being tested will be used to determine if it is an outlier or not. If the extreme value is determined to be an outlier, it is removed from the dataset and the procedure is repeated. If not, the procedure terminates and the data set can be used by an online system, such as an online product delivery system.

Figure 3:
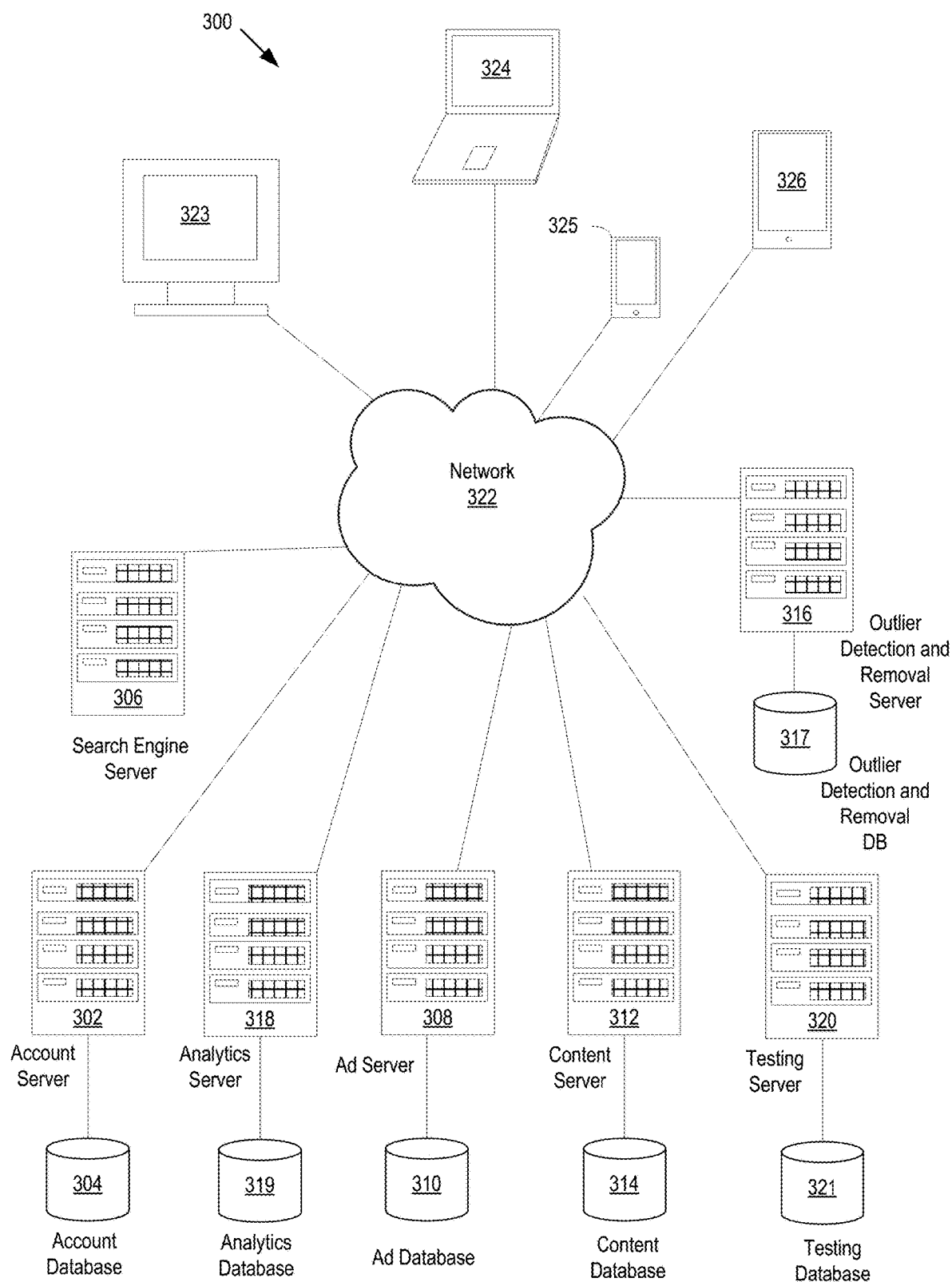
FIG. 3 illustrates a block diagram of an example information system 300 that includes example devices of a network that can communicatively couple with an example system that can provide outlier detection and removal in online user engagement data.

FIG. 3 illustrates a block diagram of an example information system 300 that includes example devices of a network that can communicatively couple with an example system that can provide online product feature updates according controlled experimentation (such as A/B tests) and outlier detection and removal. The information system 300 in the example of FIG. 3 includes an account server 302, an account database 304, a search engine server 306, an ad server 308, an ad database 310, a content server 312, a content database 314, an outlier detection and removal server 316, an outlier detection and removal database 317, an analytics server 318, an analytics database 319, a testing server 320, and a testing database 321. The aforementioned servers and databases can be communicatively coupled over a network 322. The network 322 may be a computer network. The aforementioned servers may each be one or more server computers.

The information system 300 may be accessible over the network 322 by advertiser devices and audience devices, which may be desktop computers (such as device 323), laptop computers (such as device 324), smartphones (such as device 325), and tablet computers (such as device 326). An audience device can be a user device that presents online products, such as online content. Online content can include online advertisements. In various examples of such an online information system, users may search for and obtain content from sources over the network 322, such as obtaining content from the search engine server 306, the ad server 308, the ad database 310, the content server 312, and the content database 314. Advertisers may provide advertisements for placement on online products, such as web pages, and other communications sent over the network to audience devices. The online information system can be deployed and operated by an online services provider, such as Yahoo! Inc.

The account server 302 stores account information for advertisers. The account server 302 is in data communication with the account database 304. Account information may include database records associated with a respective advertiser and online product provider. Suitable information may be stored, maintained, updated and read from the account database 304 by the account server 302. Examples include advertiser/provider identification information, advertiser/provider security information, such as passwords and other security credentials, account balance information, and information related to content associated with their ads or products, and user interactions associated with their ads or products.

The account server 302 (as any other server described herein) may be implemented using a suitable device. The account server 302 may be implemented as a single server, a plurality of servers, or another type of computing device known in the art. Access to the account server 302 can be accomplished through a firewall that protects the account management programs and the account information from external tampering. Additional security may be provided via enhancements to the online communications protocols, such as Secure HTTP (HTTPS) or the Secure Sockets Layer (SSL). The aforementioned features and security may be applied to any of the servers of FIG. 3, for example.

The account server 302 may provide an advertiser or content provider front end to simplify the process of accessing account information. The front end may be a program, application, or software routine that forms a user interface. In a particular example, the front end is accessible as a website with electronic properties that an accessing advertiser or provider may view on a personal device, such as one of the devices 323-326 when logged in. After editing such data, the data may then be saved to the account database 304.

The search engine server 306 may be one or more servers. Alternatively, the search engine server 306 may be a computer program, instructions, or software code stored on a computer-readable storage medium that runs on one or more processors of one or more servers. The search engine server 306 may be accessed by audience devices over the network 322. An audience client device may communicate a user query to the search engine server 306. For example, a query entered into a query entry box can be communicated to the search engine server 306. The search engine server 306 locates matching information using a suitable protocol or algorithm and returns information to the audience client device, such as in the form of content.

The search engine server 306 may be designed to help users and potential audience members find information located on the Internet or an intranet. In an example, the search engine server 306 may also provide to the audience client device over the network 322 an online product, such as a web page, with content, including search results, information matching the context of a user inquiry, links to other network destinations, or information and files of information of interest to a user operating the audience client device, as well as a stream or web page of content items and advertisement items (which are a type of content items) selected for display to the user. This information provided by the search engine server 306 may be logged, and such logs may be communicated to the analytics server 318 for processing and analysis. In addition to this information, any data associated with or outputted by processes of the servers of FIG. 3 may also be logged, and such logs can be communicated to the analytics server 318 for further processing and analysis. The data logs and/or the analytics outputted by the analytics server 318 and the other servers of FIG. 3 can be input for the various operations described herein, such as the operations described with respect to FIGS. 5 and 6.

Typically, the search engine server 306 may be accessed by a client device (such as the devices 323-326) via servers or directly over the network 322. The search engine server 306 may include a crawler component, an indexer component, an index storage component, a search component, a ranking component, a cache, a profile storage component, a logon component, a profile builder, and application program interfaces (APIs). The search engine server 306 may be deployed in a distributed manner, such as via a set of distributed servers, for example. Components may be duplicated within a network, such as for redundancy or better access.

The ad server 308 may be one or more servers. Alternatively, the ad server 308 may be a computer program, instructions, and/or software code stored on a computer-readable storage medium that runs on one or more processors of one or more servers. The ad server 308 operates to serve advertisements to audience devices. An advertisement may include text data, graphic data, image data, video data, or audio data. Advertisements may also include data defining advertisement information that may be of interest to a user of an audience device. The advertisements may also include respective audience targeting information and/or ad campaign information. An advertisement may further include data defining links to other online properties reachable through the network 322. The aforementioned targeting information and the other data associated with advertising may be logged in data logs. These logs, similar to other data logs described herein, can also be communicated to the analytics server 318 for further processing and analysis. The data logs and/or the analytics outputted by the analytics server 318 and the other servers of FIG. 3 can be input for the various operations described herein, such as the operations described with respect to FIGS. 5 and 6.

For online service providers, advertisements may be displayed on electronic properties resulting from a user-defined search based, at least in part, upon search terms. Also, advertising may be beneficial and/or relevant to various audiences, which may be grouped by demographic and/or psychographic. A variety of techniques have been developed to determine audience groups and to subsequently target relevant advertising to members of such groups. Group data and individual user's interests and intentions along with targeting data related to campaigns may be may be logged in data logs. As mentioned, one approach to presenting targeted advertisements includes employing demographic characteristics (such as age, income, sex, occupation, etc.) for predicting user behavior, such as by group. Advertisements may be presented to users in a targeted audience based, at least in part, upon predicted user behavior. Another approach includes profile-type ad targeting. In this approach, user profiles specific to a user may be generated to model user behavior, for example, by tracking a user's path through a website or network of sites, and compiling a profile based, at least in part, on pages or advertisements ultimately delivered. A correlation may be identified, such as for user purchases, for example. An identified correlation may be used to target potential purchasers by targeting content or advertisements to particular users. Similarly, the aforementioned profile-type targeting data may be logged in data logs. Another approach includes targeting based on content of an electronic property requested by a user. Advertisements may be placed on an electronic property or in association with other content that is related to the subject of the advertisements. The relationship between the content and the advertisement may be determined in a suitable manner. The overall theme of a particular electronic property may be ascertained, for example, by analyzing the content presented therein. Moreover, techniques have been developed for displaying advertisements geared to the particular section of the article currently being viewed by the user. Accordingly, an advertisement may be selected by matching keywords, and/or phrases within the advertisement and the electronic property. The aforementioned targeting data may be logged in data logs. These logs then can be input for the various operations described herein, such as the operations described with respect to FIGS. 5 and 6.

The ad server 308 includes logic and data operative to format the advertisement data for communication to an audience member device, which may be any of the devices 323-326. The ad server 308 is in data communication with the ad database 310. The ad database 310 stores information, including data defining advertisements, to be served to user devices. This advertisement data may be stored in the ad database 310 by another data processing device or by an advertiser. The advertising data may include data defining advertisement creatives and bid amounts for respective advertisements and/or audience segments. The aforementioned ad formatting and pricing data may be logged in data logs. These logs then can be input for the various operations described herein, such as the operations described with respect to FIGS. 5 and 6.

The advertising data may be formatted to an advertising item that may be included in a stream of content items and advertising items provided to an audience device. The formatted advertising items can be specified by appearance, size, shape, text formatting, graphics formatting and included information, which may be standardized to provide a consistent look for advertising items in the stream. The aforementioned advertising data may be logged in data logs.

Further, the ad server 308 is in data communication with the network 322. The ad server 308 communicates ad data and other information to devices over the network 322. This information may include advertisement data communicated to an audience device. This information may also include advertisement data and other information communicated with an advertiser device. An advertiser operating an advertiser device may access the ad server 308 over the network to access information, including advertisement data. This access may include developing advertisement creatives, editing advertisement data, deleting advertisement data, setting and adjusting bid amounts and other activities. The ad server 308 then provides the ad items to other network devices, such as the outlier detection and removal server 316 and the testing server 320, the analytics server 318, and/or the account server 302. This information can be logged, and such logs then can be input for the various operations described herein, such as the operations described with respect to FIGS. 5 and 6.

The ad server 308 may provide an advertiser front end to simplify the process of accessing the advertising data of an advertiser. The advertiser front end may be a program, application or software routine that forms a user interface. In one particular example, the advertiser front end is accessible as a website with electronic properties that an accessing advertiser may view on the advertiser device. The advertiser may view and edit advertising data using the advertiser front end. After editing the advertising data, the advertising data may then be saved to the ad database 310 for subsequent communication in advertisements to an audience device. In viewing and editing the advertising data, adjustments can be used as input for the various operations and aspects described herein, such as the operations described with respect to FIGS. 5 and 6. The advertiser front end may also provide a graphical user interface for simulating ad campaigns according to operations performed herein.

The content server 312 may access information about content items either from the content database 314 or from another location accessible over the network 322. The content server 312 communicates data defining content items and other information to devices over the network 322. The information about content items may also include content data and other information communicated by a content provider operating a content provider device. A content provider operating a content provider device may access the content server 312 over the network 322 to access information. This access may be for developing content items, editing content items, deleting content items, setting and adjusting bid amounts and other activities, such as associating content items with certain types of ad campaigns. A content provider operating a content provider device may also access the outlier detection and removal server 316 and the testing server 320 over the network 322 to access analytics data and controller related data. Such analytics and controller data may help focus developing content items, editing content items, deleting content items, setting and adjusting bid amounts, and activities related to distribution of the content.

The content server 312 may provide a content provider front end to simplify the process of accessing the content data of a content provider. The content provider front end may be a program, application or software routine that forms a user interface. In a particular example, the content provider front end is accessible as a website with electronic properties that an accessing content provider may view on the content provider device. The content provider may view and edit content data using the content provider front end. After editing the content data, such as at the content server 312 or another source of content, the content data may then be saved to the content database 314 for subsequent communication to other devices in the network 322. In editing the content data, adjustments to controller variables and parameters may be determined and presented upon editing of the content data, so that a publisher can view how changes affect deliver of one or more ad campaigns or online products.

The content provider front end may be a client-side application. A script and/or applet and the script and/or applet may manage the retrieval of campaign data. In an example, this front end may include a graphical display of fields for selecting audience segments, segment combinations, or at least parts of campaigns. Then this front end, via the script and/or applet, can request data related to ad campaign delivery or online product delivery from the outlier detection and removal server 316 and the testing server 320. The information related to campaign or product delivery can then be displayed, such as displayed according to the script and/or applet.

The content server 312 includes logic and data operative to format content data for communication to the audience device. The content server 312 can provide content items or links to such items to the analytics server 318 or the outlier detection and removal server 316 and the testing server 320 to associate with campaign or product delivery online. For example, content items and links may be matched to such data. The matching may be complex and may be based on historical information related to control of campaigns, such as delivery control of ad campaigns and features of online products.

The content data may be formatted to a content item that may be included in a stream of content items and advertisement items provided to an audience device. The formatted content items can be specified by appearance, size, shape, text formatting, graphics formatting and included information, which may be standardized to provide a consistent look for content items in the stream. The formatting of content data and other information and data outputted by the content server may be logged in data logs. For example, content items may have an associated bid amount that may be used for ranking or positioning the content items in a stream of items presented to an audience device. In other examples, the content items do not include a bid amount, or the bid amount is not used for ranking the content items. Such content items may be considered non-revenue generating items. The bid amounts and other related information may be logged in data logs.

The aforementioned servers and databases may be implemented through a computing device. A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities. In general, a server may include a central processing unit and memory. A server may also include a mass storage device, a power supply, wired and wireless network interfaces, input/output interfaces, and/or an operating system, such as Windows Server, Mac OS X, UNIX, Linux, FreeBSD, or the like.

The aforementioned servers and databases may be implemented as online server systems or may be in communication with online server systems. An online server system may include a device that includes a configuration to provide data via a network to another device including in response to received requests for page views or other forms of content delivery. An online server system may, for example, host a site, such as a social networking site, examples of which may include, without limitation, Flicker, Twitter, Facebook, LinkedIn, or a personal user site (such as a blog, vlog, online dating site, etc.). An online server system may also host a variety of other sites, including educational sites, dictionary sites, encyclopedia sites, wikis, financial sites, government sites, etc.

An online server system may further provide a variety of services that may include web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as an online server system include desktop computers, multiprocessor systems, microprocessor-type or programmable consumer electronics, etc. The online server system may or may not be under common ownership or control with the servers and databases described herein.

The network 322 may include a data communication network or a combination of networks. A network may couple devices so that communications may be exchanged, such as between a server and a client device or other types of devices, including between wireless devices coupled via a wireless network, for example. A network may also include mass storage, such as a network attached storage (NAS), a storage area network (SAN), or other forms of computer or machine readable media, for example. A network may include the Internet, local area networks (LANs), wide area networks (WANs), wire-line type connections, wireless type connections, or any combination thereof. Likewise, sub-networks, such as may employ differing architectures or may be compliant or compatible with differing protocols, may interoperate within a larger network, such as the network 322.

Various types of devices may be made available to provide an interoperable capability for differing architectures or protocols. For example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links, including satellite links, or other communication links or channels, such as may be known to those skilled in the art. Furthermore, a computing device or other related electronic devices may be remotely coupled to a network, such as via a telephone line or link, for example.

An advertiser client device, which may be any one of the device 323-326, includes a data processing device that may access the information system 300 over the network 322. The advertiser client device is operative to interact over the network 322 with any of the servers or databases described herein. The advertiser client device may implement a client-side application for viewing electronic properties and submitting user requests. The advertiser client device may communicate data to the information system 300, including data defining electronic properties and other information. The advertiser client device may receive communications from the information system 300, including data defining electronic properties and advertising creatives. The aforementioned interactions and information may be logged in data logs.

In an example, content providers may access the information system 300 with content provider devices that are generally analogous to the advertiser devices in structure and function. The content provider devices provide access to content data in the content database 314, for example.

An audience client device, which may be any of the devices 323-326, includes a data processing device that may access the information system 300 over the network 322. The audience client device is operative to interact over the network 322 with the search engine server 306, the ad server 308, the content server 312, the outlier detection and removal server 316 and the testing server 320, and the analytics server 318. The audience client device may implement a client-side application for viewing electronic content and submitting user requests. A user operating the audience client device may enter a search request and communicate the search request to the information system 300. The search request is processed by the search engine and search results are returned to the audience client device. The aforementioned interactions and information may be logged.

In other examples, a user of the audience client device may request data, such as a page of information from the information system 300. The data may also be provided in another environment, such as a native mobile application, TV application, or an audio application. The information system 300 may provide the data or re-direct the browser to another source of the data. In addition, the ad server may select advertisements from the ad database 310 and include data defining the advertisements in the provided data to the audience client device. The aforementioned interactions and information may be logged in data logs and such logs.

An advertiser client device and an audience client device operate as a client device when accessing information on the information system 300. A client device, such as any of the devices 323-326, may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In another example, a web-enabled client device may include a physical or virtual keyboard, mass storage, an accelerometer, a gyroscope, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating messages, such as via email, short message service (SMS), or multimedia message service (MMS), including via a network, such as a social network, including, for example, Facebook, LinkedIn, Twitter, Flickr, or Google+, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally or remotely stored or streamed video, or games. The foregoing is provided to illustrate that claimed subject matter is intended to include a wide range of possible features or capabilities. At least some of the features, capabilities, and interactions with the aforementioned may be logged in data logs.

Also, the disclosed methods and systems may be implemented at least partially in a cloud-computing environment, at least partially in a server, at least partially in a client device, or in a combination thereof.

Figure 4:
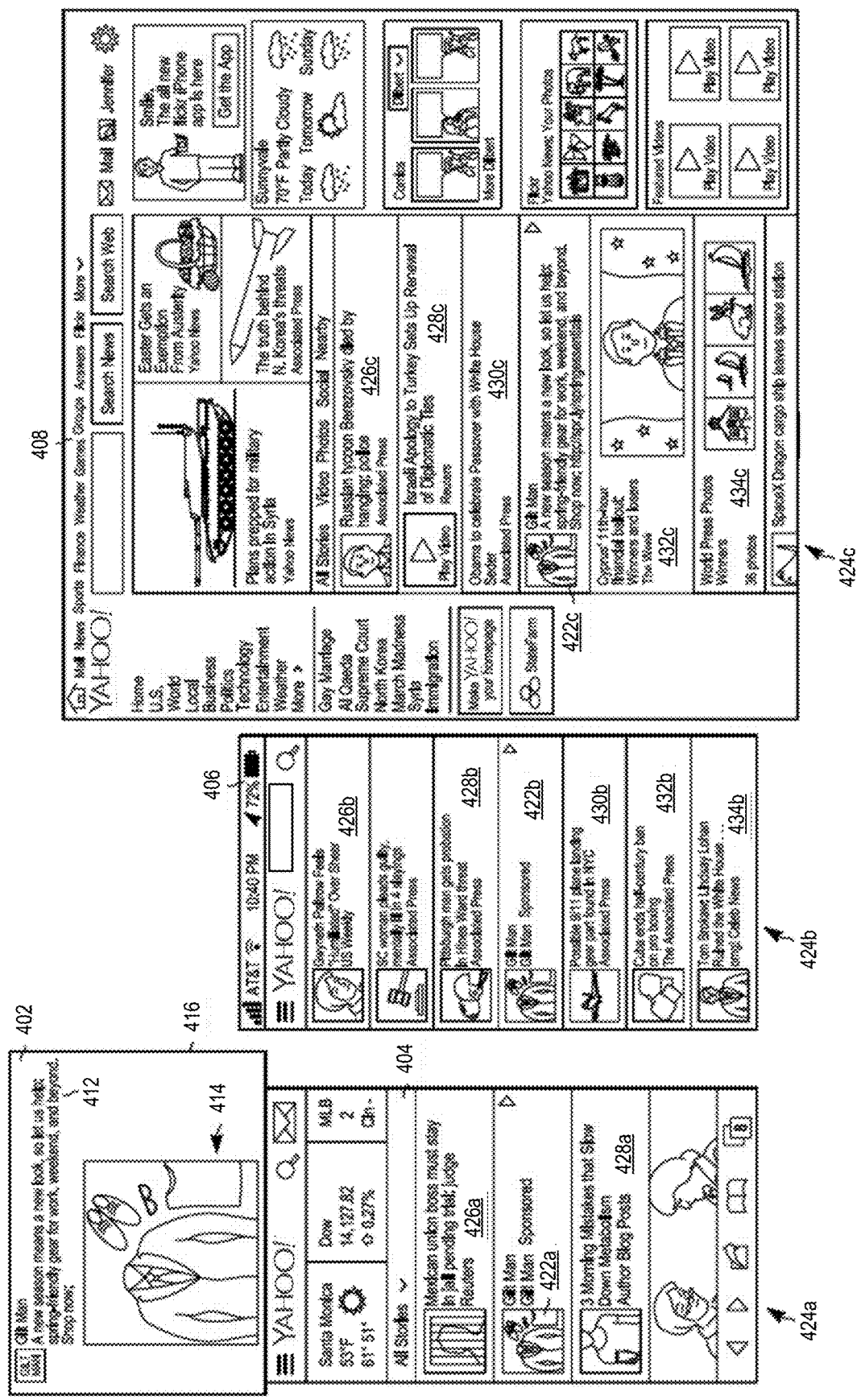
FIG. 4 illustrates displayed ad items and content items of example screens rendered by client-side applications. Some of the displayed items may be provided through advertising channels that feature delivery of online products at least partially guided by user engagement data with removed outlier values.

FIG. 4 illustrates displayed online products including ad items and content items of example screens rendered by client-side applications. The content items and ad items displayed may be provided by the search engine server 306, the ad server 308, or the content server 312. User interactions with the ad items and content items can be tracked and logged in data logs, and the logs may be communicated to the analytics server 318 for processing. Once processed into corresponding analytics data, the analytics data can be input for the various operations and aspects described herein, such as the operations and aspects described with respect to FIGS. 5 and 6. Also, session data including indications of the user interactions with the items may be directly communicated to the interface circuitry of severs (such as interface circuitry of servers 316, 318, and 320 and then identified and logged by the log circuitry of these servers as well. The result of these operations of the log circuitry may result in the user engagement data with ads, content, and other types of online products. The user engagement data can be used in the controlled tests described herein, such as the A/B tests. The data logs and/or the analytics outputted by the servers 316, 318, and 320 can be input for the various operations and aspects described herein, such as the operations and aspects described with respect to FIGS. 5 and 6.

In FIG. 4, a display ad 402 is illustrated as displayed on a variety of displays including a mobile web device display 404, a mobile application display 406 and a personal computer display 408. The mobile web device display 404 may be shown on the display screen of a smart phone, such as the device 325. The mobile application display 406 may be shown on the display screen of a tablet computer, such as the device 326. The personal computer display 408 may be displayed on the display screen of a personal computer (PC), such as the desktop device 323 or the device 324.

The display ad 402 is shown in FIG. 4 formatted for display on an audience device. The display ad 402 includes text 412, graphic images 414 and a defined boundary 416. The display ad 402 can be developed by an advertiser for placement on an electronic property, such as a web page, sent to an audience device operated by a user. The display ad 402 may be placed in a wide variety of locations on the electronic property. The defined boundary 416 and the shape of the display ad can be matched to a space available on an electronic property. If the space available has the wrong shape or size, the display ad 402 may not be useable. Such reformatting may be logged in data logs and such logs may be communicated to the analytics server 318 for processing. The data logs and/or the processed analytics can be input for the various operations and aspects described herein, such as the operations and aspects described with respect to FIGS. 5 and 6.

In these examples, the display ad is shown as a part of streams 424a, 424b, and 424c. The streams 424a, 424b, and 424c include a sequence of items displayed, one item after another, for example, down an electronic property viewed on the mobile web device display 404, the mobile application display 406 and the personal computer display 408. The streams 424a, 424b, and 424c may include various types of items. In the illustrated example, the streams 424a, 424b, and 424c include content items and advertising items. For example, stream 424a includes content items 426a and 428a along with advertising item 422a; stream 424b includes content items 426b, 428b, 430b, 432b, 434b and advertising item 422b; and stream 424c includes content items 426c, 428c, 430c, 432c and 434c and advertising item 422c. With respect to FIG. 4, the content items can be items published by non-advertisers. Also, these content items may include advertising components. Each of the streams 424a, 424b, and 424c may include a number of content items and advertising items.

In an example, the streams 424a, 424b, and 424c may be arranged to appear to the user to be a sequence of items, so that as a user, of an audience device on which one of the streams 424a, 424b, or 424c is displayed, scrolls the display, a sequence of items appears in the displayed stream. The scrolling can occur via the scroll bars, for example, or by other known manipulations, such as a user dragging his or her finger downward or upward over a touch screen displaying the streams 424a, 424b, or 424c. To have a more seamless sequence of items so that the items display quicker from manipulations by the user, the items can be cached by a local cache and/or a remote cache associated with the client-side application or the page view. Such interactions may be communicated to the analytics server 318. The corresponding analytics outputted by the analytics server 318 can be input for the various operations and aspects described herein, such as the operations and aspects described with respect to FIGS. 5 and 6.

The content items positioned in any of streams 424a, 424b, and 424c may include news items, business-related items, sports-related items, etc. Further, in addition to textual or graphical content, the content items of a stream may include other data as well, such as audio and video data or applications. Each content item may include text, graphics, other data, and a link to additional information. Clicking or otherwise selecting the link re-directs the browser on the client device to an electronic property referred to as a landing page that contains the additional information. The clicking or otherwise selecting of the link, the re-direction to the landing page, the landing page, and the additional information, for example, can each be tracked, and then the data associated with the tracking can be logged in data logs, and such logs may be communicated to the analytics server 318 for processing. The data logs and/or the analytics outputted by the analytics server 318 can be input for the various operations and aspects described herein, such as the operations and aspects described with respect to FIGS. 5 and 6.

Stream ads like the advertising items 422a, 422b, and 422c may be inserted into the stream of content, supplementing the sequence of related items, providing a more seamless experience for end users. Similar to content items, the advertising items may include textual or graphical content as well as other data, such as audio and video data or applications. Each advertising items 422a, 422b, and 422c may include text, graphics, other data, and a link to additional information. Clicking or otherwise selecting the link re-directs the browser on the client device to an electronic property referred to as a landing page. The clicking or otherwise selecting of the link, the re-direction to the landing page, the landing page, and the additional information, for example, can each be tracked, and then the data associated with the tracking can be logged in data logs, and such logs may be communicated to the analytics server 318 for processing. The data logs and/or the analytics outputted by the analytics server 318 can be input for the various operations and aspects described herein, such as the operations and aspects described with respect to FIGS. 5 and 6.

While the streams 424a, 424b, and 424c are shown with an advertising item 422a, 422b, and 422c, respectively, a number of advertising items may be included in a stream of items. Also, the advertising items may be slotted within the content, such as slotted the same for all users or slotted based on personalization or grouping, such as grouping by audience members or content. Adjustments of the slotting may be according to various dimensions and algorithms. Also, slotting may be according to campaign control.

The slotting and any other operation associated with campaign control described herein may occur via controller interface circuitry that provides interfacing between a controller and other types of circuits, such as a circuit of any of the servers illustrated in FIG. 3. The controller interface circuitry and the controller may be hosted on the outlier detection and removal server 316 and the testing server 320.

Figure 5:
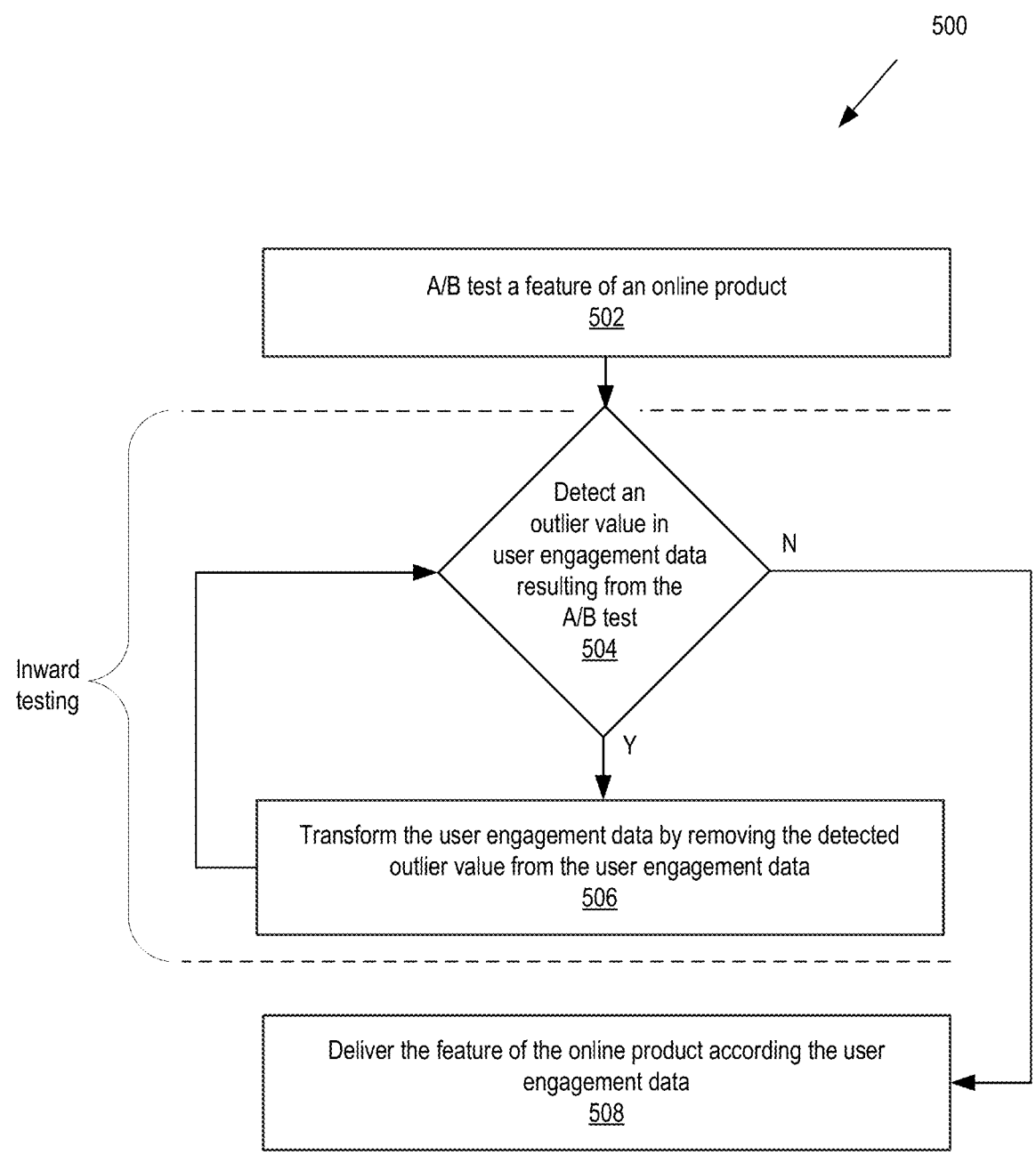
FIGS. 5 and 6 illustrate example operations performed by a system, such as the systems illustrated in FIGS. 3 and 7.
Figure 6:
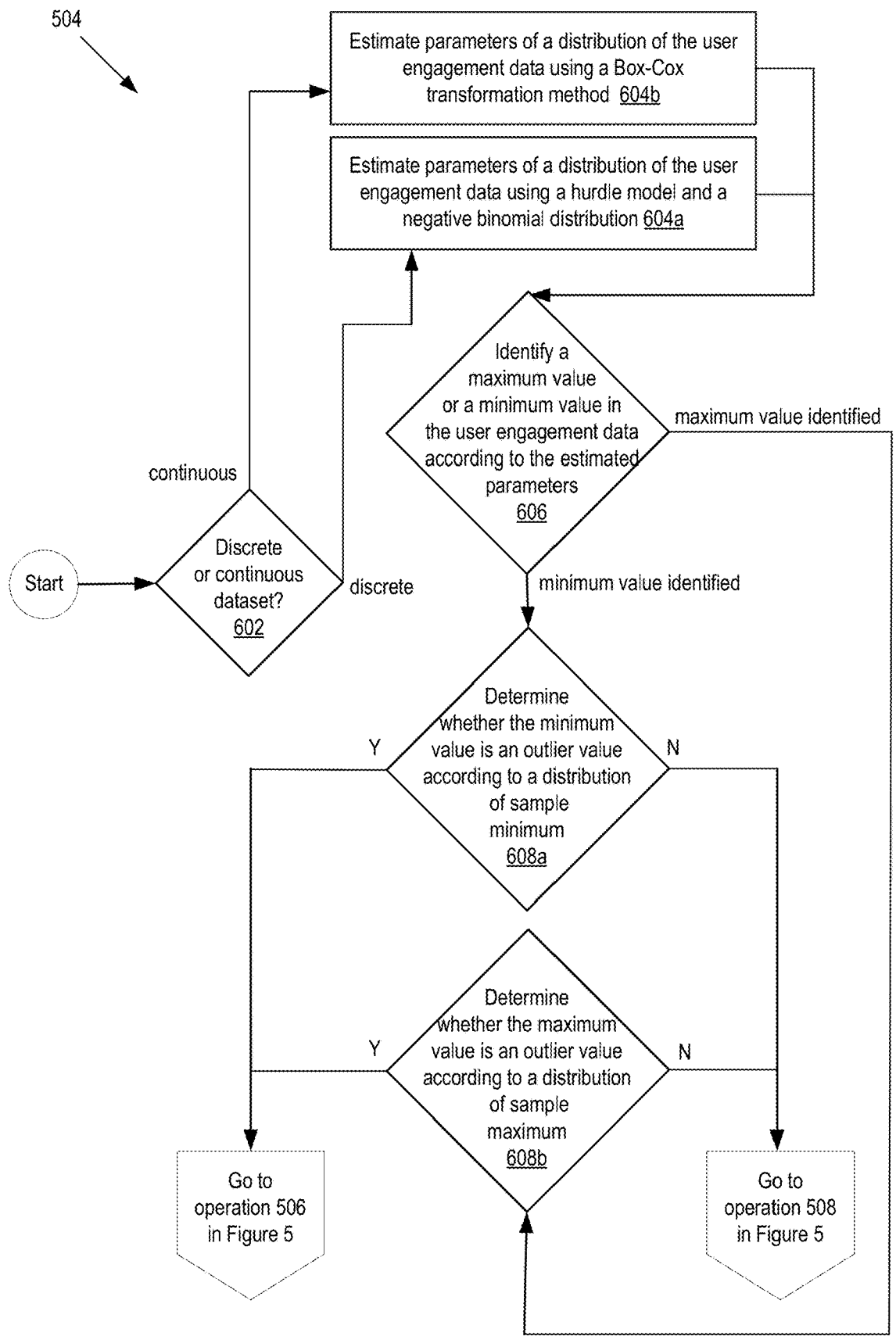
Figure 7:
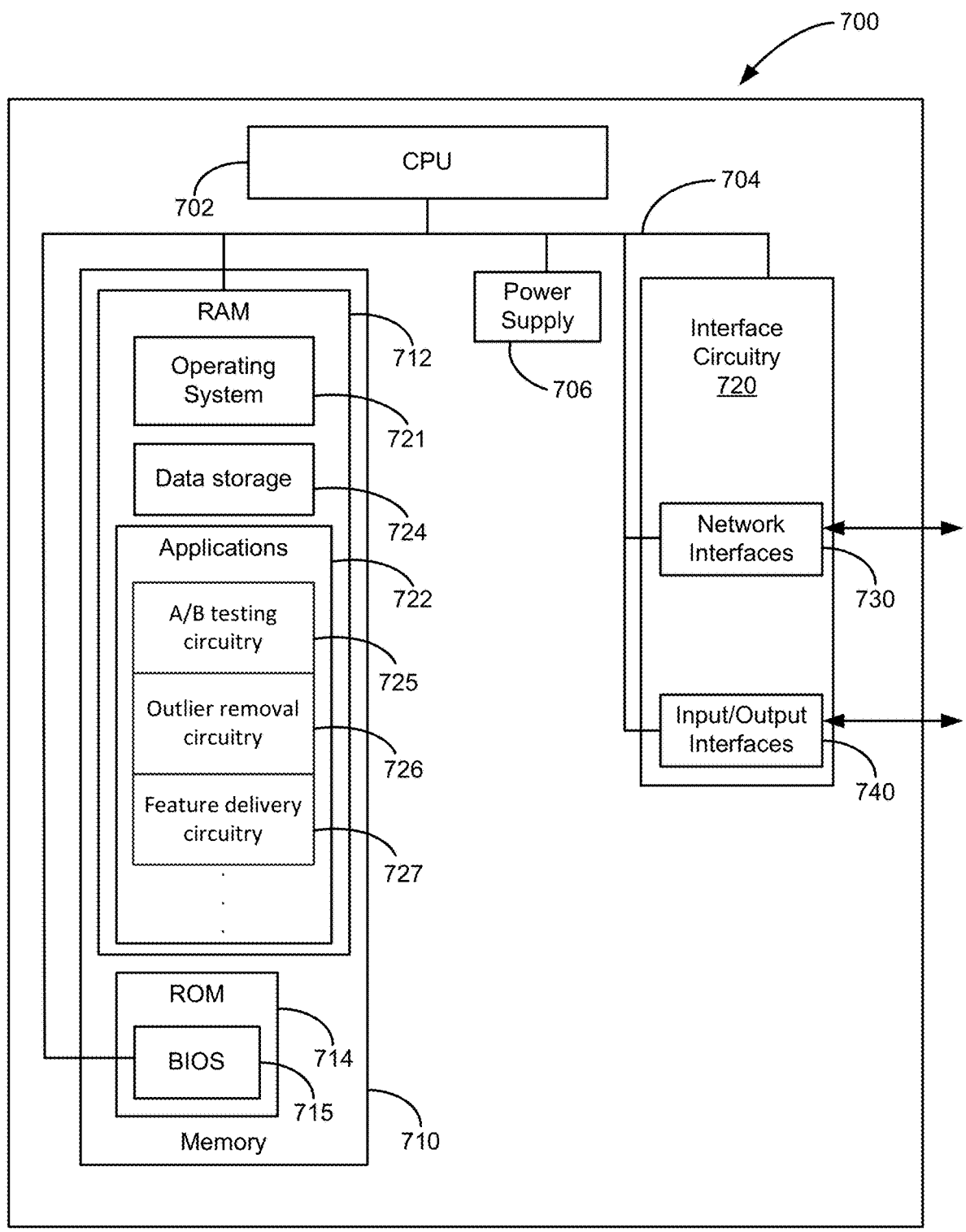
FIG. 7 illustrates a block diagram of an example device of a system that can provide the outlier detection and removal in online user engagement data.

FIGS. 5 and 6 illustrate operations 500 and 504, respectively, performed by one or more servers, such as one or more of the servers illustrated in FIGS. 3 and 7. Circuitries 725-727 of the electronic device 700 in FIG. 7 can perform the operations 500, respectively. The operations 500 can provide direction for delivery of features of an online product. For example, the operations 500 can enhance targeted advertising. The directions can be according to controlled testing (such as A/B testing) and analysis and/or filtering of the test results, such as filtering that includes removing outliers from the test results.

For example, a server can include controlled testing circuitry (such as A/B testing circuitry 725), configured to test a feature of an online product for an effect of the feature on user engagement with the online product (such as the A/B test of a feature of an online product at 502). The effect of the feature on user engagement with the online product can be relative to page views or impressions of the online product. Also, the effect of the feature on user engagement with the online product can be relative to clicks on a part of the online product, for example.

The testing circuitry can also be configured to communicate user engagement data associated with the effect to requesting circuitry. A server can include outlier removal circuitry (such as outlier removal circuitry 726), configured to request user engagement data from the controlled testing circuitry. In an example, the testing circuitry can be included in the testing server 320 of FIG. 3, and the outlier removal circuitry can be included in the outlier detection and removal server 316.

The outlier removal circuitry can also be configured to detect an outlier value in the user engagement data and remove the outlier value in the user engagement data. For example, FIG. 5 illustrates, at 504, circuitry such as the outlier removal circuitry detecting an outlier value in user engagement data resulting from the A/B test at 502. In this example, circuitry can then transform the user engagement data by removing the detected outlier value from the user engagement data at 506. This can reoccur according to an inward testing procedure until an outlier is not detected at 504 in the user engagement data.

In an example, an outlier can be an observation that deviates so much from other observations as to arouse suspicion that it was generated by a different mechanism than those that are under observation. Also, an outlier value can indicate statistically that more likely than not the value is invalid. Online, an outlier value can indicate statistically that more likely than not the outlier value is due to user engagement with the online product by an Internet bot or another type of artificial mechanism. Also, an outlier value can indicate statistically that more likely than not the outlier value is due to fraudulent user engagement with the online product.

The outlier removal circuitry can also be configured to communicate the user engagement data subsequent to removal of one or more outliers, to requesting circuitry. A server (such as any one of servers 306, 308, and 312 in FIG. 3, which can provide an online product) can include circuitry such as feature delivery circuitry 727 that can request user engagement data from the outlier removal circuitry. At 508, circuitry of that requesting server (such as the feature delivery circuitry 727) can deliver a feature of an online product according to the user engagement data that is absent of outlier values removed at 506.

With respect to the detection of the outlier value at 504, the outlier removal circuitry, at 602, can determine whether the data set from the testing at 502 is discrete or continuous. This determination can be according to a preset threshold degree of discreteness in data. Accordingly, the circuitry can then estimate parameters of a distribution of the user engagement data using a hurdle model and a negative binomial distribution at 604a, if it is determined that the data set includes discrete values. Otherwise, the circuitry can estimate parameters of a distribution of the user engagement data using a Box-Cox transformation method at 604b. Alternatively, the Box-Cox transformation can be used for either discrete or continuous values. Also, the hurdle model and the negative binomial distribution can be used for either discrete or continuous values.

In an example, the hurdle model includes a truncated negative binomial distribution. Also, the hurdle model can be configured to generate a binary outcome. Also, the hurdle model can be configured to identify zero versus positive values in the user engagement data, the negative binomial distribution is based on the identified positive values.

In an example, Poisson distribution can be used as a parametric model for the density estimate, $$P(x|\lambda) = e^{-\lambda}\frac{\lambda^x}{x!}.$$

In some examples, the Poisson distribution may not be flexible enough for most online experiment data. Its density function can be determined by one parameter, $\lambda$, which is often too restrictive. FIG. 2, illustrates two example issues with the Poisson model. One can be due to the assumption that mean and variance are equal in a Poisson distribution. Online experiment data generally has a long tail so that the variance is much higher than the mean. This assumption therefore is not usually satisfied by online experiment data. Another example issue can be that the number of zero counts usually deviates from the expectation of Poisson distribution. One reason for this result is that a portion of users who view an online product typically do not click on tested features of the product. In an example, there may be no zero counts in a homepage page view data set, because the system logs the behavior from users who visit the page. If a user visited the homepage, that user will have contributed at least one page view. Thus, an unmodified Poisson distribution may not be best suited for such issues that occur in online experiment data.

In order to remedy such issues, including over-dispersion of results and zero count adjustment, the system can replace the Poisson distributions with a hurdle model. The hurdle can be a two-component model with a truncated count component for positive counts and a hurdle component that models zero versus larger counts. This can resolve the aforementioned issues because a binomial probability model governs a binary outcome of whether a count variable has a zero or a positive value. If the value is positive, the "hurdle is crossed" and the conditional distribution of the positive values are governed by a zero-truncated count model. Therefore, the hurdle component in the model will be able to be satisfied with a large zero count.

The truncated negative binomial distribution can be used as the positive component in order to solve the over-dispersion issue with the Poisson distribution. A negative binomial distribution can depend on two parameters and thus be more flexible for over-dispersed data. The negative binomial distribution can be defined by $$P(x|\rho, \gamma) = \frac{\Gamma(x+\gamma)}{x!\Gamma(\gamma)}(1-\rho)^\gamma \rho^x$$

where $\Gamma(\bullet)$
is the gamma function. The truncated negative binomial distribution can be $$P(x|x>0, \rho, \gamma) = \frac{1}{1-(1-\rho)^\gamma}\frac{\Gamma(x+\gamma)}{x!\Gamma(\gamma)}(1-\rho)^\gamma \rho^x.$$

The hurdle model can be expressed as:

$$(x|p, \rho, \gamma) = \begin{cases} 1-p & \text{if } x=0 \\ p\frac{1}{1-(1-\rho)^\gamma}\frac{\Gamma(x+\gamma)}{x!\Gamma(\gamma)}(1-\rho)^\gamma \rho^x & \text{if } x>0 \end{cases}.$$

The negative binomial distribution can be a continuous mixture of Poisson distributions where the mixing distribution of the Poisson rate is a gamma distribution. Wherein $x|z \sim \text{Poisson}(z\lambda)$ and $z \sim \text{Gamma}(\theta, \theta)$, the probability mass function of x is $$P(x|\lambda, \theta) = \int P(x|z, \lambda)f(z|\theta)dz = \frac{\Gamma(x+\theta)}{x!\Gamma(\theta)}\frac{\lambda^x \theta^\theta}{(\lambda+\theta)^{x+\theta}}$$

can be equal to the probability mass function of a negative binomial distribution $P(x|\rho,\gamma)$ with $$\gamma = \theta \text{ and } \rho = \frac{\lambda}{\lambda+\theta}.$$

The system can then view the negative binomial distribution as a Poisson($z\lambda$) distribution, where z is a random variable with the Gamma distribution. The variance of negative binomial distribution is not restricted to be equal to the mean, as is a Poisson distribution, since $$\text{Var}(x) = \lambda\left(1+\frac{\lambda}{\theta}\right) = E(x)\left(1+\frac{\lambda}{\theta}\right).$$

The dimension $\theta$ allows the variance to be diffuse to fit over-dispersed data.

The outlier removal circuitry can also identify a most extreme value, such as a maximum value or a minimum value, in the user engagement data according to the estimated parameters at 606. At 608a, the circuitry can determine whether the minimum value is an outlier value according to a distribution of sample minimum, if at 606 a minimum value was identified at the extreme value. At 608b, the circuitry can determine whether the maximum value is an outlier value according to a distribution of sample maximum, if at 606 a maximum value was identified the extreme value. In an example, the distribution of sample maximum or the distribution of sample minimum is a parametric distribution. With regard to the determinations of whether an extreme value is an outlier, either way, if the extreme value is determined to be an outlier than operations return to operation 506 in FIG. 5. Operation 506 is the transforming the user engagement data by removing the detected outlier value from the user engagement data.

In an example, the system can use sample maximum or minimum for outlier detection. One of many benefits is that the statistic is free of the normality assumption. Also, the hypothesis test can be applied to any parametric model as long as the target distribution F is specified. With the target distribution F estimated, the system can derive the distribution of a sample maximum statistic. Wherein $X_{max}$ is the sample maximum of a univariate sample $\{x_1, \ldots, x_n\}$, the cumulative probability can be $P(X_{max} \leq x) = P(x_1, \ldots, x_n \leq x) = \Pi_{i=1}^{n} P(x_i \leq x) = F(x)^n$.

The system can build a hypothesis test using sample maximum as the test statistic to test whether the observed maximum value in the sample, for example, $x_0$, is an outlier or not. The null hypothesis is that $x_0$ is not a valid observation and the alternative hypothesis is that $x_0$ is an outlier. Under the null hypothesis, the p-value is calculated with $P(X_{max\_x} \geq x_0 | x_0 \text{ is valid}) = 1 - F(x_0)^n$. The system can then determine whether the observed maximum value $x_0$ is an outlier by comparing $P(X_{max} \geq x_0 | x_0 \text{ is valid})$ with a predetermined significance level, such as a significance level of 0.05.

For sample minimum, which is denoted by $X_{min}$, the system can derive a cumulative density function using a calculation analogous to $X_{max}$: $P(X_{min} \leq x) = 1 - P(X_{min} \geq x) = 1 - \Pi_{i=1}^{n} P(x_i \geq x) = 1 - (1 - F(x))^n$. The system can build a hypothesis test using sample minimum to determine whether the observed minimum value in the sample, for example, $x_0$, is an outlier or not. Under the null hypothesis, the p-value can be $P(X_{min} \leq x_0 | x_0 \text{ is valid}) = 1 - (1 - F(x_0))^n$.

In such examples, when sample maximum and/or minimum are considered, the system can use a target distribution F to identify the maximum and/or minimum. Wherein $x_l$ and $x_u$ denote sample minimum and maximum, respectively, the system can compare $P(X < x_l) = F(x_l)$ and $P(X > x_u) = 1 - F(x_u)$. If $P(X < x_l) < P(X > x_u)$, and sample minimum can be selected as the most extreme value. Otherwise, sample maximum is selected.

The outlier removal circuitry can configured to remove the maximum value or the minimum value based on the determination of whether the maximum value or the minimum value is the outlier value. In such an example, the outlier removal circuitry may also be configured to inward test the user engagement data by repeating the identification, the determination, and the removal of the maximum or the minimum value based on the determination, the repeating of the identification, the determination, and the removal of the maximum or the minimum value occurring until the outlier removal circuitry determines that the maximum value or the minimum value is not an outlier value. In other words, the operations move to operation 508, which is delivering the feature of the online product according the user engagement data, wherein outlier values have been removed from the engagement data.

FIG. 7 is a block diagram of an electronic device 700 that can implement aspects of and related to operations described herein. FIG. 7 illustrates a server. In another example, the aspects of the electronic device 700 could be implemented on multiple servers. The electronic device 700 includes a CPU 702, memory 710, a power supply 706, and input/output components, such as network interfaces 730 and input/output interfaces 740, and a communication bus 704 that connects the aforementioned elements of the electronic device. The network interfaces 730 can include a receiver and a transmitter (or a transceiver), and an antenna for wireless communications. The network interfaces 730 can also include at least part of interface circuitry. The CPU 702 can be any type of data processing device, such as a central processing unit (CPU). Also, for example, the CPU 702 can be central processing logic.

The memory 710, which can include random access memory (RAM) 712 or read-only memory (ROM) 714, can be enabled by multiple memory devices. The RAM 712 can store data and instructions defining an operating system 721, data storage 724, and applications 722, such as applications implemented through hardware including the A/B testing circuitry 725, the outlier removal circuitry 726, and the feature delivery circuitry 727. The applications 722 may include hardware (such as circuitry and/or microprocessors), firmware, software, or any combination thereof. The ROM 714 can include basic input/output system (BIOS) 715 of the electronic device 700. The memory 710 may include a non-transitory medium executable by the CPU.

The power supply 706 contains power components, and facilitates supply and management of power to the electronic device 700. The input/output components can include at least part of interface circuitry for facilitating communication between any components of the electronic device 700, components of external devices (such as components of other devices of the information system 300), and end users. For example, such components can include a network card that is an integration of a receiver, a transmitter, and I/O interfaces, such as input/output interfaces 740. The input/output components, such as input/output interfaces 740, can include user interfaces such as monitors, keyboards, touchscreens, microphones, and speakers. Further, some of the I/O components, such as input/output interfaces 740, and the communication bus 704 can facilitate communication between components of the electronic device 700, and can ease processing performed by the CPU 702.

The electronic device 700 can send and receive signals, such as via a wired or wireless network, or may be capable of processing or storing signals, such as in memory as physical memory states, and may, therefore, operate as a server. The electronic device 700 can include a single server, dedicated rack-mounted servers, desktop computers, laptop computers, set top boxes, integrated devices combining various features, such as two or more features of the foregoing devices, or the like.

The invention claimed is:

1. A system, comprising:
    testing circuitry, configured to:
        test a feature of an online product for an effect of the feature on user engagement with the online product; and
        communicate user engagement data associated with the effect to requesting circuitry;
    outlier removal circuitry, configured to:
        request the user engagement data from the testing circuitry;
        detect an outlier value in the user engagement data;
        remove the outlier value in the user engagement data to generate updated user engagement data, wherein the updated user engagement data does not comprise the outlier value;
        communicate the updated user engagement data subsequent to removal of the outlier value to the requesting circuitry; and
        wherein detecting the outlier value comprises:
            estimating parameters of a distribution of the user engagement data using a hurdle model and a negative binomial distribution;
            identifying a maximum value or a minimum value in the user engagement data according to the parameters; and
            determining whether the maximum value or the minimum value is at least one outlier value according to a distribution of sample maximum or a distribution of sample minimum; and feature delivery circuitry, configured to:
request at least some user engagement data from the outlier removal circuitry; and
control delivery of one or more features of one or more online products according to the updated user engagement data such that delivery of at least one of the one or more features of the one or more online products is guided by the updated user engagement data generated based upon the removal of the outlier value detected in the user engagement data associated with the effect of the feature, wherein the controlling delivery of the one or more features of the one or more online products comprises (i) formatting a shape of at least one feature of the one or more online products based upon the updated user engagement data generated based upon the removal of the outlier value detected in the user engagement data associated with the effect of the feature, (ii) determining a plurality of spaces on an electronic property of the one or more online products and (iii) matching the shape of the at least one feature to a space, of the plurality of spaces, determined to be available on the electronic property of the one or more online products.

2. The system of claim 1, wherein the controlling delivery of the one or more features of the online product comprises formatting text of the one or more online products based upon the updated user engagement data generated based upon the removal of the outlier value detected in the user engagement data associated with the effect of the feature.

3. The system of claim 1, wherein the controlling delivery of the one or more features of the online product comprises placing the at least one feature in a location of the one or more online products based upon the updated user engagement data generated based upon the removal of the outlier value detected in the user engagement data associated with the effect of the feature.

4. The system of claim 1, wherein the controlling delivery of the one or more features of the online product comprises formatting a graphic of the at least one feature of the one or more online products based upon the updated user engagement data generated based upon the removal of the outlier value detected in the user engagement data associated with the effect of the feature.

5. The system of claim 1, wherein the controlling delivery of the one or more features of the online product comprises formatting a size of the at least one feature of the one or more online products based upon the updated user engagement data generated based upon the removal of the outlier value detected in the user engagement data associated with the effect of the feature.

6. The system of claim 1, wherein the outlier removal circuitry is configured to remove the maximum value or the minimum value based on the determination of whether the maximum value or the minimum value is at least one outlier value.

7. The system of claim 6, wherein the outlier removal circuitry is configured to inward test the user engagement data by repeating the identification, the determination, and the removal of the maximum value or the minimum value until the outlier removal circuitry determines that the maximum value or the minimum value is not at least one outlier value.

8. The system of claim 1, wherein the effect of the feature on user engagement with the online product is relative to page views of the online product.

9. The system of claim 1, wherein the effect of the feature on user engagement with the online product is relative to clicks on a part of the online product.

10. The system of claim 1, wherein the distribution of sample maximum or the distribution of sample minimum is a parametric distribution.

11. The system of claim 1, wherein the outlier value indicates statistically that more likely than not the outlier value is invalid.

12. The system of claim 1, wherein the outlier value indicates statistically that more likely than not the outlier value is due to user engagement with the online product by an Internet bot.

13. The system of claim 1, wherein the outlier value indicates statistically that more likely than not the outlier value is due to fraudulent user engagement with the online product.

14. A method, comprising:
testing, by a processor, a feature of an online product for an effect of the feature on user engagement with the online product, resulting in user engagement data;
estimating parameters of a distribution of the user engagement data using a hurdle model and a negative binomial distribution, the hurdle model generating a binary outcome that indicates zero versus positive values in the user engagement data and the negative binomial distribution based upon the positive values;
identifying a maximum value in the user engagement data according to the parameters;
determining that the maximum value is an outlier value according to a parametric distribution of sample maximum;
transforming the user engagement data by removing the outlier value in the user engagement data to generate updated user engagement data, wherein the updated user engagement data does not comprise the outlier value; and
controlling, by the processor, delivery of one or more features of the online product according to the updated user engagement data such that delivery of at least one of the one or more features of the online product is guided by the updated user engagement data generated based upon the removal of the outlier value determined in the user engagement data associated with the effect of the feature, wherein the controlling delivery of the one or more features of the online product comprises (i) formatting a shape of at least one feature of the online product based upon the updated user engagement data generated based upon the removal of the outlier value determined in the user engagement data associated with the effect of the feature, (ii) determining a plurality of spaces on an electronic property of the online product and (iii) matching the shape of the at least one feature to a space, of the plurality of spaces, determined to be available on the electronic property of the online product.

15. The method of claim 14, further comprising inward testing the user engagement data by repeating the identification, the determination, and the transformation until determining that the maximum value is not at least one outlier value.

16. The method of claim 14, wherein the effect of the feature on user engagement with the online product is relative to page views of the online product or clicks on a part of the online product.

17. The method of claim 14, wherein the outlier value indicates statistically that more likely than not the outlier value is invalid due to at least one of user engagement with the online product by an Internet bot or fraudulent user engagement with the online product.

18. A non-transitory computer readable medium, comprising instructions executable by a processor to:
   estimate parameters of a distribution of user engagement data using a hurdle model and a truncated negative binomial distribution, the hurdle model generating a binary outcome that indicates zero versus positive values in the user engagement data and the truncated negative binomial distribution based on the positive values, and the user engagement data derived from a test of a feature of an online product for an effect of the feature on user engagement with the online product;
   identify a most extreme value in the user engagement data according to the parameters;
   determine that the most extreme value is an outlier value according to a parametric distribution of sample maximum or minimum;
   transform the user engagement data by removing the outlier value in the user engagement data to generate updated user engagement data, wherein the updated user engagement data does not comprise the outlier value; and
   control delivery of one or more features of the online product according to the updated user engagement data such that delivery of at least one of the one or more features of the online product is guided by the updated user engagement data generated based upon the removal of the outlier value determined in the user engagement data associated with the effect of the feature, wherein the controlling delivery of the one or more features of the online product comprises (i) formatting a shape of at least one feature of the online product based upon the updated user engagement data generated based upon the removal of the outlier value determined in the user engagement data associated with the effect of the feature, (ii) determining a plurality of spaces on an electronic property of the online product and (iii) matching the shape of the at least one feature to a space, of the plurality of spaces, determined to be available on the electronic property of the online product.

19. The non-transitory computer readable medium of claim 18, further comprising instructions executable by the processor to inward test the user engagement data by repeating the identification, the determination, and the transformation until determining that the most extreme value is not at least one outlier value.

20. The non-transitory computer readable medium of claim 19, wherein the effect of the feature is relative to page views of the online product or clicks on a part of the online product.

* * * * *